United States Patent [19]
Tohyama et al.

[11] Patent Number: 5,351,966
[45] Date of Patent: Oct. 4, 1994

[54] IMAGE SYNTHESIZING SCOPE AND IMAGE SYNTHESIZER USING THE SAME

[75] Inventors: Shigeki Tohyama, Kawasaki; Hiroshi Igarasi; Takumi Ohgane, both of Yokohama, all of Japan

[73] Assignee: Namco Ltd., Tokyo, Japan

[21] Appl. No.: 12,649

[22] Filed: Feb. 3, 1993

[30] Foreign Application Priority Data

Feb. 5, 1992 [JP] Japan .................................. 4-56446

[51] Int. Cl.$^5$ .............................................. A63F 9/22
[52] U.S. Cl. ..................................... 273/311; 273/310; 273/312; 273/316; 273/85 G; 472/58; 472/61; 434/44; 434/43
[58] Field of Search ........................ 273/311–313, 273/85 G, DIG. 28; 359/618, 629, 630; 434/43, 44; 472/57, 58, 61, 63

[56] References Cited

U.S. PATENT DOCUMENTS

| | | | |
|---|---|---|---|
| 4,395,045 | 7/1983 | Baer | 273/312 |
| 4,600,200 | 7/1986 | Oka et al. | 273/313 |
| 4,645,058 | 9/1987 | Carter, III et al. | 273/311 |
| 4,895,376 | 1/1990 | Chiang Shiung-Fei | 273/313 |
| 4,971,312 | 11/1990 | Weinreich | 350/600 |
| 5,190,286 | 3/1993 | Watanabe et al. | 273/85 G |
| 5,213,335 | 5/1993 | Dole et al. | 273/313 |

FOREIGN PATENT DOCUMENTS 60-84573  5/1985  Japan .
62-89689  6/1987  Japan .

*Primary Examiner*—Jessica J. Harrison
*Assistant Examiner*—Kerry Owens
*Attorney, Agent, or Firm*—Oliff & Berridge

[57] ABSTRACT

A game apparatus includes a game stage formed by a three-dimensional model and a plurality of image synthesizing scopes disposed radially toward the game stage.

Each of the image synthesizing scopes is adapted to synthesize and display the scene of the game stage superimposed on a video scene. The video scene is formed as a panorama scene which is displayed superimposing over substantially the entire area of the game stage. Each of the image synthesizing scopes is adapted to scrollingly display the window scene to be viewed through the viewing window while being superimposed on the actually viewed scene of the game stage, within the extent of the panorama scene.

20 Claims, 10 Drawing Sheets

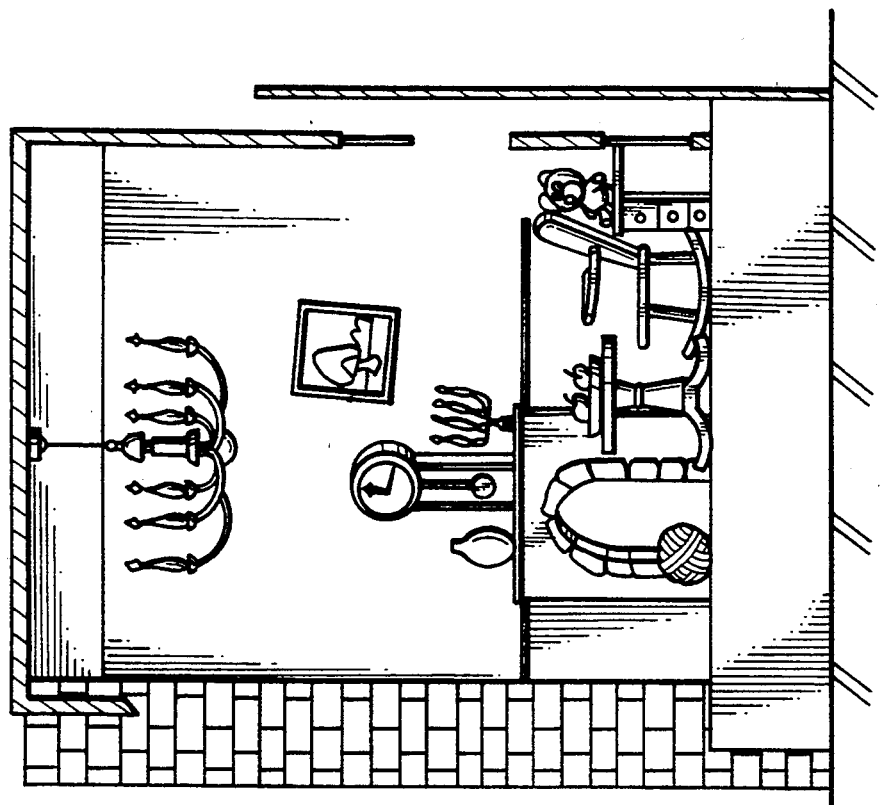
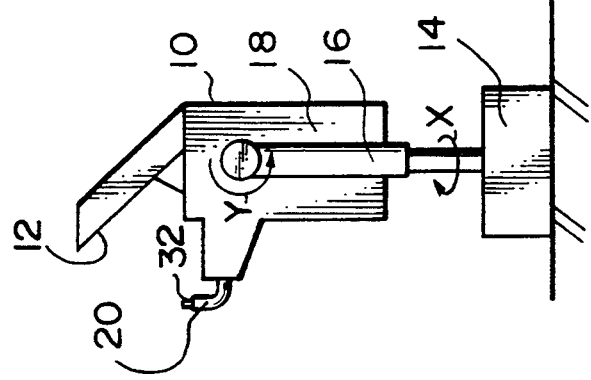
FIG. 1

IMAGE SYNTHESIZING SCOPE AND IMAGE SYNTHESIZER USING THE SAME

BACKGROUND OF THE INVENTION

1. Field of the Invention

The present invention relates to an image synthesizing scope for synthesizing and displaying two image and an image synthesizer using such an image synthesizing scope.

2. Description of the Related Art

There is known an image synthesizing technique which synthesizes and displays two images using a half-mirror. Such a technique is described, for example, in Japanese Utility Model Laid-Open No. Sho 62-89689 or Japanese Patent Laid-Open No. Sho 60-84573.

The former discloses a display system which comprises a half-mirror providing two optical paths and a video monitor located in one of the two optical paths, the other optical path receiving an object to be displayed. A scene in the video monitor is superimposed on the object.

The latter discloses another display system which comprises a half-mirror 2 disposed in front of an observer M, as shown in FIG. 12. An image is projected from a projector 3 located on the side of the observer M to form a reflective image. An object 5 is positioned on the opposite side to the observer M and viewed through the half-mirror surface. The reflective image is superimposed on the viewed image of the object 5. Thus, various images can be combined and displayed. This is very effective in advertisement, education and other fields.

As will be apparent from the foregoing, the prior art is adapted to display a composite image which is obtained by super-imposing a stationary object on a moving scene. This can provide a visually improved effect which is obtained from the combination of an actual object with a moving scene.

However, the prior art can only provide a composite image within a range of display which is limited by the ability of CRT or the like. If the object 5 is a larger one or if the object 5 is located over a relatively large space, the prior art cannot synthesize and display a composite image which is obtained by superimposing the scene on the large space.

The prior art can provide any motion only on the side of the moving scene since it is the stationary object which is superimposed on the moving scene.

SUMMARY OF THE INVENTION

It is therefore an object of the present invention to provide an image synthesizing scope which can synthesize and display a composite image by superimposing a video scene on a scene having an increased space.

Another object of the present invention is to provide an image synthesizing system which can perform a visually varied production by forming a video scene adapted to the motion of a three-dimensional model and also by providing the moving composite scene both on the side of the three-dimensional model used as a background and on the side of the video scene displayed and imposed on the three-dimensional model scene.

Still another object is to provide a shooting game playing apparatus which can utilize said image synthesizing scope or system to form and display a target character by the video scene, the target character being displayed in a viewing window of said scope and shot by a user.

To this end, the present invention provides an image synthesizing scope which comprises:

a viewing window formed to view a predetermined play space in any direction;

a direction detecting sensor for sensing a direction in which said viewing window is facing;

a transparent reflector effective to form a composite image and including optical transparent- and reflecting-side paths, the optical path of said viewing window being located in one of said optical transparent- and reflecting-side paths;

a video display disposed in the other of said optical transparent- and reflecting-side paths of said transparent reflector such that a window image is superimposed through said transparent reflector on the scene viewed through said viewing window; and means for displaying and controlling a window image of said video display, said displaying and controlling means comprising:

image data memory means for storing the data of a panorama scene which is variable with the proceeding of a play; and image synthesizing means responsive to the output of said direction detecting sensor relating to the sensed direction for reading the data of a window image to be viewed through the viewing window out of the data of said panorama scene and for displaying the window image on said video display, whereby said window image can be scrollingly displayed while being superimposed on the scene in said play space which is viewed through the viewing window.

The present invention also provides an image synthesizing system which comprises:

a three-dimensional model having a movable part used in the production and defining a play space; and at least one image synthesizing scope formed to view said three-dimensional model in any direction, said image synthesizing scope comprising:

a viewing window;

a direction detecting sensor for sensing a direction in which said viewing window is facing;

a transparent reflector effective to form a composite image and including optical transparent- and reflecting-side paths, the optical path of said viewing window being located in one of said optical transparent- and reflecting-side paths;

a video display disposed in the other of said optical transparent- and reflecting-side paths of said transparent reflector such that a window image is superimposed through said transparent reflector on the scene of said three-dimensional model viewed through said viewing window; and means for displaying and controlling the window image of said video display in adaptation to the motion of said movable part in said three-dimensional model, said displaying and controlling means comprising:

image data memory means for storing the data of a panorama scene which is variable depending on the motion of said movable part and which is displayed over said three-dimensional model; and image synthesizing means responsive to the output of said direction detecting sensor relating to the sensed direction for reading the data of a window image to be viewed through the viewing window out of the data of said panorama scene and for displaying the window image on said video display, whereby said window image can be scrollingly displayed while being superimposed on the scene in said play space which is viewed through the viewing window.

The present invention further provides a shooting game apparatus which comprises:

at least one image synthesizing scope for displaying a target character; and a shooting device for shooting the target character displayed by said image synthesizing scope, said image synthesizing scope comprising:

a viewing window formed to view a predetermined play space in any direction;

a direction detecting sensor for sensing a direction in which said viewing window is facing;

a transparent reflector effective to form a composite image and including optical transparent- and reflecting-side paths, the optical path of said viewing window being located in one of said optical transparent- and reflecting-side paths;

a video display disposed in the other of said optical transparent- and reflecting-side paths of said transparent reflector such that a window image is superimposed through said transparent reflector on the scene viewed through said viewing window; and means for displaying and controlling a window image of said video display, said displaying and controlling means comprising:

image data memory means for storing the data of a panorama scene including said target caractor which is variable with the proceeding of a play; and image synthesizing means responsive to the output of said direction detecting sensor relating to the sensed direction for reading the data of a window image to be viewed through the viewing window out of the data of said panorama scene and for displaying the window image on said video display, whereby said window image including said target caractor can be scrollingly displayed while being superimposed on the scene in said play space which is viewed through the viewing window, said shooting device comprising:

shooting means for aiming the target character displayed in said viewing window and including a trigger for generating a trigger signal to shoot said target character when said trigger is actuated;

means for detecting the position aimed by said shooting means; and hit judging means responsive to the position of said target character that is displayed by said displaying and controlling means to detect the hit area in said target character and to judge whether or not said aimed position is within said hit area when said trigger signal is generated.

The transparent reflector used in the image synthesization may be formed by any suitable means such as half-mirror, transparent plate or the like.

The image synthesizing scope of the present invention can be formed to view the play space through the viewing window in all the direction.

In the image synthesizing scope, the image data memory means has previously stored the data of a panorama scene which is variable with the proceeding of a play. Based on the direction of the viewing window which is sensed by the direction detecting sensor, the image data to be viewed and ranged by the viewing window is read from the panorama image data and scrollingly displayed superimposed on the scene of the viewing window through the transparent reflector such as half-mirror or the like.

According to the image synthesizing scope of the present invention, thus, the play space and panorama scene can be viewed through the viewing window in any direction while they are synthesized to form a composite scene. The game space may be formed as a haunted house, for example, by using a three-dimensional model. Data of a panorama image to be superimposed on this haunted house, including various characters such as ghosts or other monsters, has been previously prepared. When the game space is viewed directly by a player, he or she can see only a plain house. When the haunted house is viewed by the player through the image synthesizing scope of the present invention, however, he or she can see a goblin moving through a door or a monster floating near a chandelier while the window image is being scrolled depending on the viewing direction. Therefore, the present invention can greatly improve the visual production in the game.

It is particularly noted that the present invention makes the image synthesization by the use of scrolling technique. Any large-sized display is not required to cover the entire area of the panorama scene. Rather, the present invention only requires a display of sufficient size to display the video scene in the area of the image synthesizing scope which can be viewed through the viewing window. Consequently, the present invention can use only an inexpensive image synthesizing scope which can display the video scene over an increased scene in the game space.

According to the present invention, further, the movable part used in the production is provided in the three-dimensional model defining the play space while at the same time the image data memory means has stored the data of the panorama scene which is variable depending on the motion of the movable part. When the three-dimensional model is viewed through the image synthesizing scope, the image of the three-dimensional model is displayed superimposed on the window image such that the video scene (window image) is being varied depending on the motion of the movable part in the three-dimensional model providing a background. Therefore, a visually varied effect can be provided by showing the motion of the composite image both in the three-dimensional background model and in the video foreground scene.

The three-dimensional model may have a plurality of movable parts such as door, chandelier and the like. The panorama video scene superimposed on the three-dimensional model may include various characters which are displayed and controlled to provide a light leaked through an opened door or to fly out sequentially through the opened door. When the three-dimensional model is viewed, at a position adjacent to the opened door, through the image synthesizing scope, a scene can be observed as if the light leaks through the door being opened and the characters fly out through the opened door. This provides a composite image which is very visually improved with an increased production.

Where such an image synthesizing scope and an image synthesizing system utilizing the scope are applied to a shooting game machine, a target character can be synthesized and displayed from the video scene (window image). Since the video image is provided as image data representing the position of the target character which is displayed, whether or not the target is hit can be judged with reality. This provides a visually varied shooting game which pleasures many players.

BRIEF DESCRIPTION OF THE DRAWINGS

FIG. 1 is a schematic side view of one preferred embodiment of a shooting game apparatus constructed in accordance with the present invention.

DETAILED DESCRIPTION OF THE PREFERRED EMBODIMENTS

Figure 2:
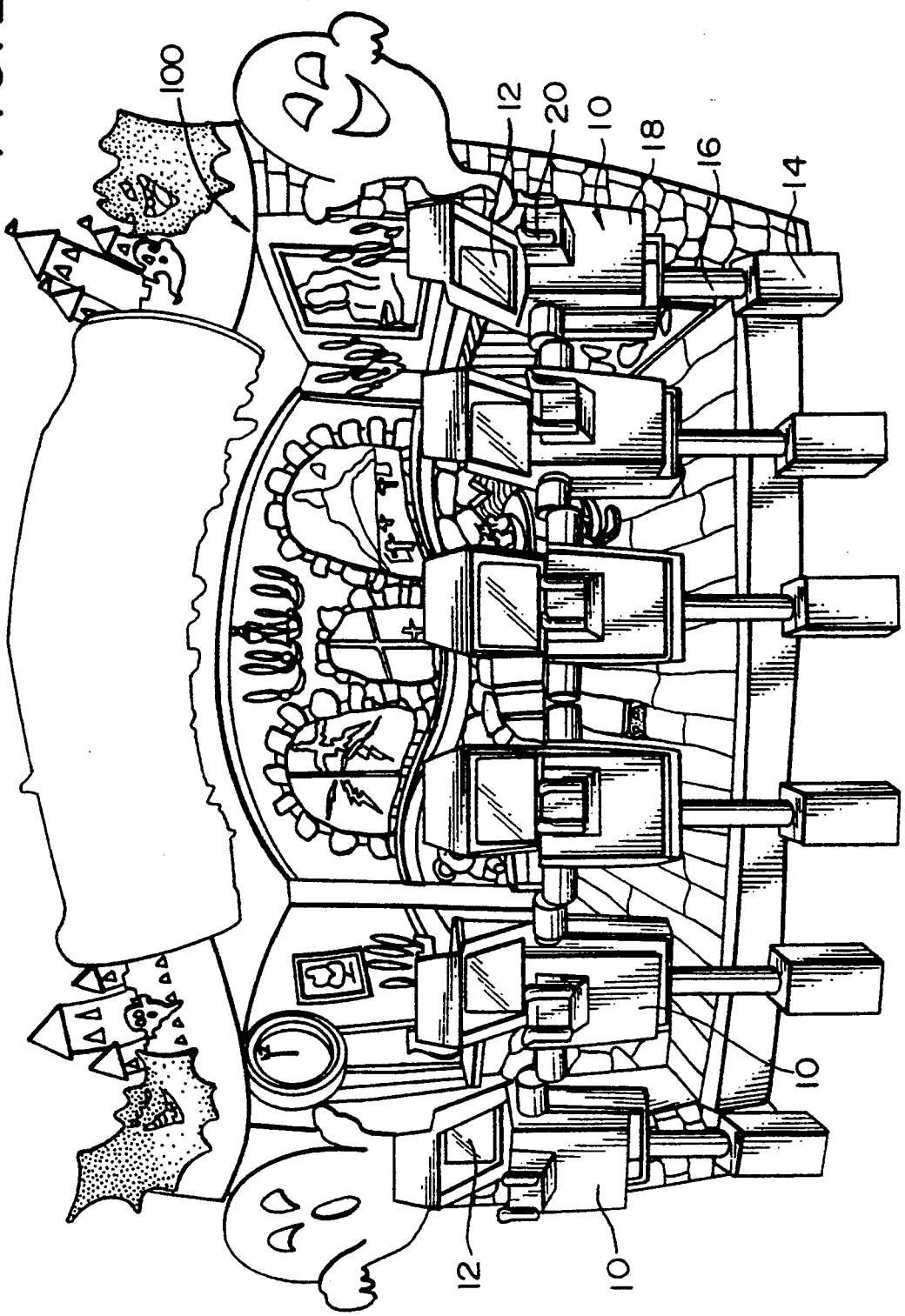
FIG. 2 is a schematic front view of the shooting game apparatus shown in FIG. 1.

Referring first to FIGS. 1 and 2, there is shown a shooting game apparatus constructed in accordance with the present invention. The shooting game apparatus comprises a game stage 100 formed by using a three-dimensional model and a plurality of image synthesizing scopes 10 which are located radially toward the game stage 100.

Each of the image synthesizing scopes 10 comprises a base 14, a support frame 16 mounted on the base 14 for rotation in the horizontal direction (X-direction), and a scope body 18 mounted on the support frame 16 for rotation in the vertical direction (Y-direction). Each scope 10 is used by a player such that he or she can view a scene in the game stage 100 at any position through a viewing window 12 while grasping a grip 20.

In the shooting game according to this embodiment, the game stage 100 is so assumed that it is a lone house located far from town and adjacent to a burying place. A player is so assumed that he or she is a ghost hunter seeking for ghosts in the lone house. The hunter uses his or her image synthesizing scope 10 to shoot and hunt away the ghosts from the lone house.

Figure 3:
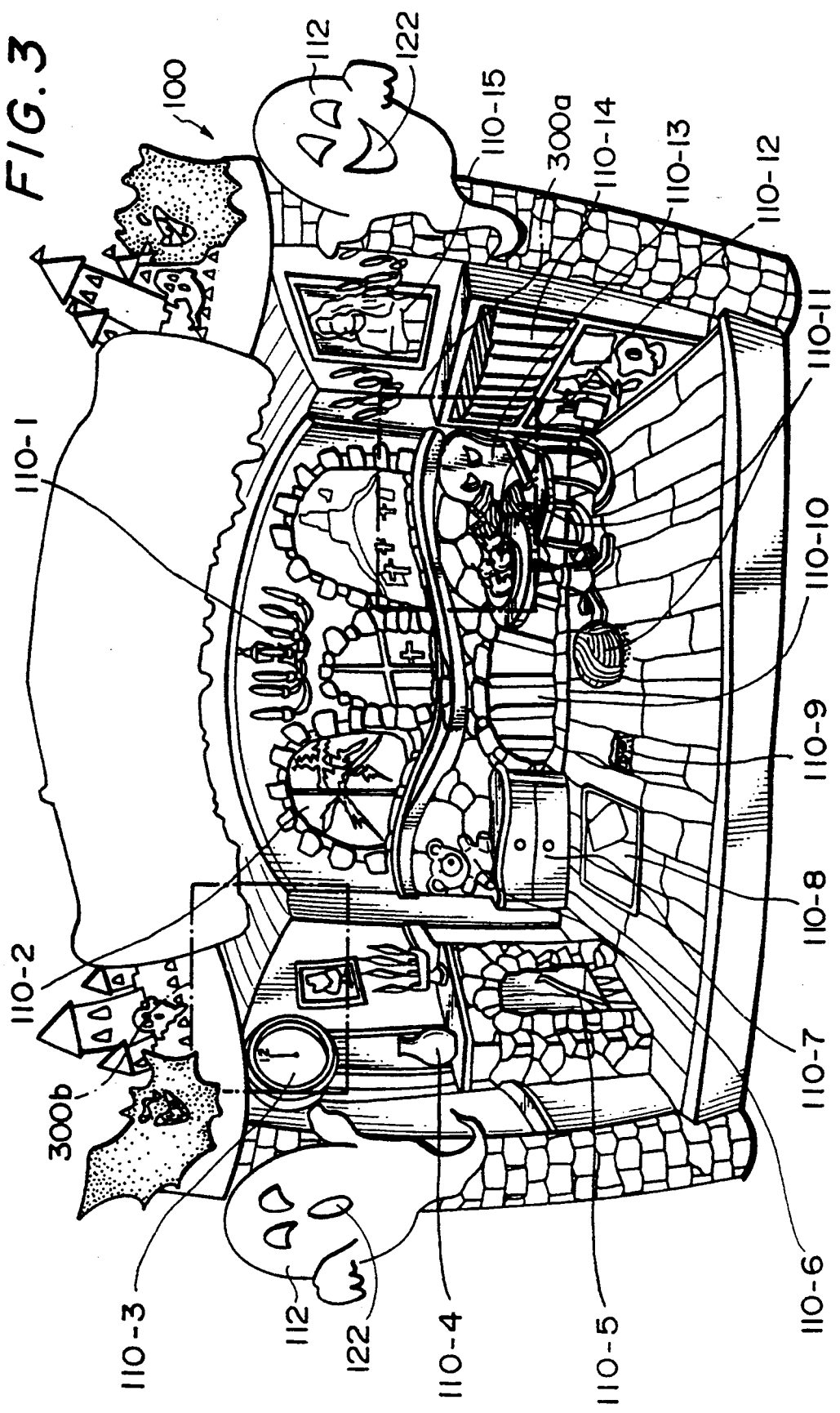
FIG. 3 is a schematic view illustrating the game stage of the shooting game apparatus shown in FIGS. 1 and 2.

FIG. 3 shows the details of the aforementioned game stage. The game stage is assumed to be the interior of a lone house which is infested with ghosts. The game stage has a plurality or movable parts, for example, a swinging chandelier 110-1; an automatically opening and closing window 110-2; a clock 110-3 having distractedly rotating hands; a meaning pot 110-4 which is rocking; a clatteringly moving poker 110-5; a dancing stuffed toy 110-6; a vigorously moving-in and moving-out drawer 110-7; a noisily opening lid 110-8 leading to a basement; suspiciously gleaming eyes 110-9 which are viewed through a cleft in the floor; a laughing window 110-10 which is carefully observed to form part or a huge race formed over the entire wall; randomly moving knitting ball and sweater being knitted 110-11; a jumping fruit 110-12 with the impression or teeth; an automatically rocking chair 110-13; books 110-14 which are automatically moving from a shelf; and an automatically slipping-down picture 110-15. These movable parts are sequentially controlled to cause an atmosphere which is infested with ghosts. Furthermore, a pair of monster models 112 are provided in the right- and left-sides of the game stage 100. Each of the monster models 112 includes a mouth in which a speaker 122 is mounted to output effect sounds.

In the shooting game apparatus of this embodiment, no ghost will be observed when a player directly views the game stage shown in FIG. 3. However, the ghosts appearing in the room can be observed when the game stage 100 is viewed by the player only through the viewing window 12 in the image synthesizing scope 10.

Figure 4:
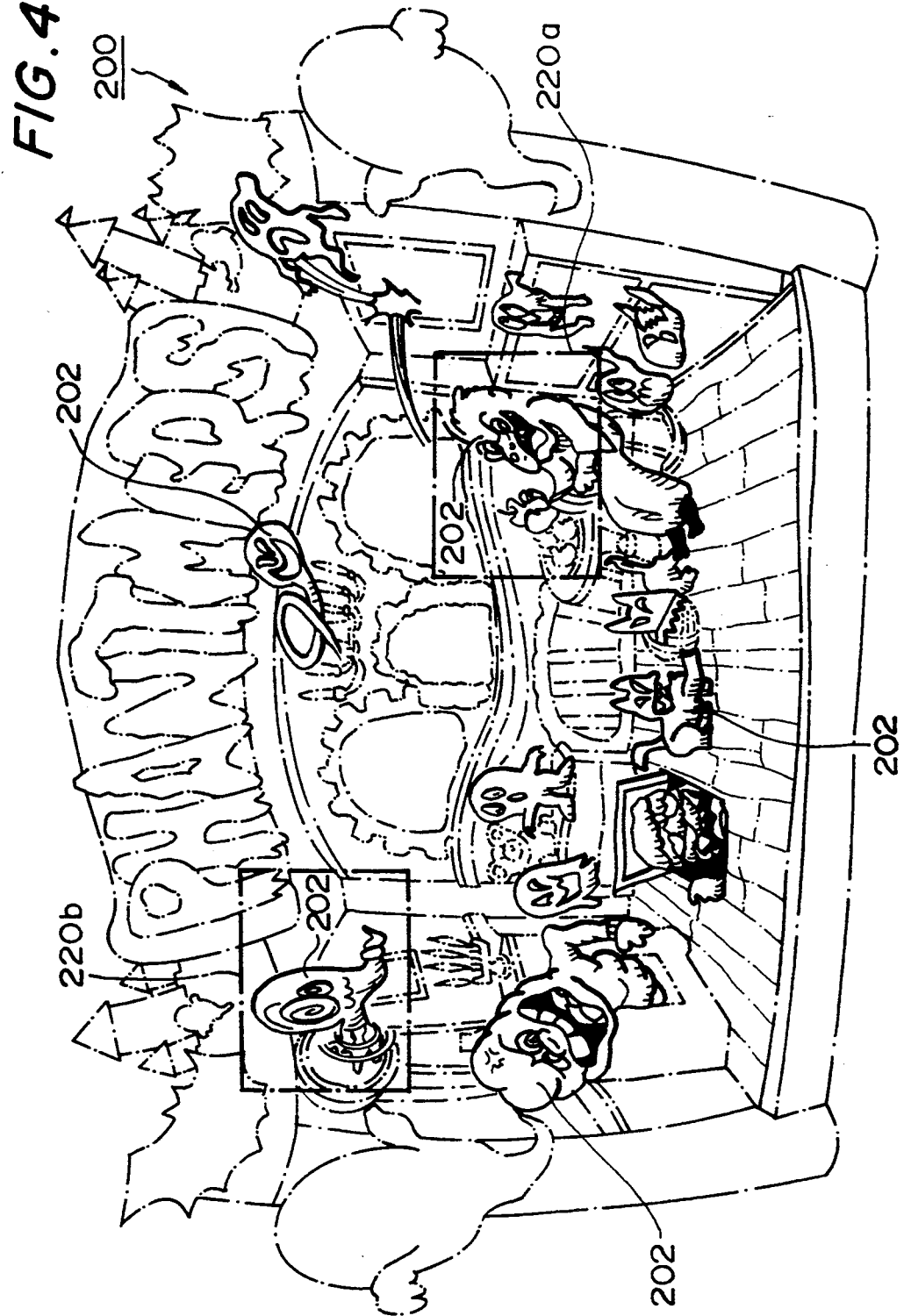
FIG. 4 is a view illustrating a panorama scene superimposed over the game stage of FIG. 3.

FIG. 4 is a video scene showing a room which is infested with ghosts. The video scene is formed as a panorama scene 200 which is displayed and superimposed on the game stage 100 of FIG. 3 through the entire area thereof. The image synthesizing scope 10 is adapted to scroll the window scene 220 viewed through the viewing window 12 within the extent of the panorama scene 200 such that the window scene 220 within be displayed and superimposed on the actually observed scene of the game stage 100. When the player views the viewing window 12 of the scope 100, he or she can see ghosts moving in the game stage 100.

When the player views a scene 300a of FIG. 3, for example, which includes the rocking chair through the scope 10, he or she can observe a monster sitting on the chair and knitting a sweater as shown by a window scene 220a in FIG. 4. When the player then observes the clock 110-3, he or she can view a ghost rotating the hands as shown by a window scene 220b in FIG. 4.

Thus, the player can seek for and shoot various ghosts appearing in the game stage 100 through the viewing window 12 in the image synthesizing scope 100.

Figure 5:
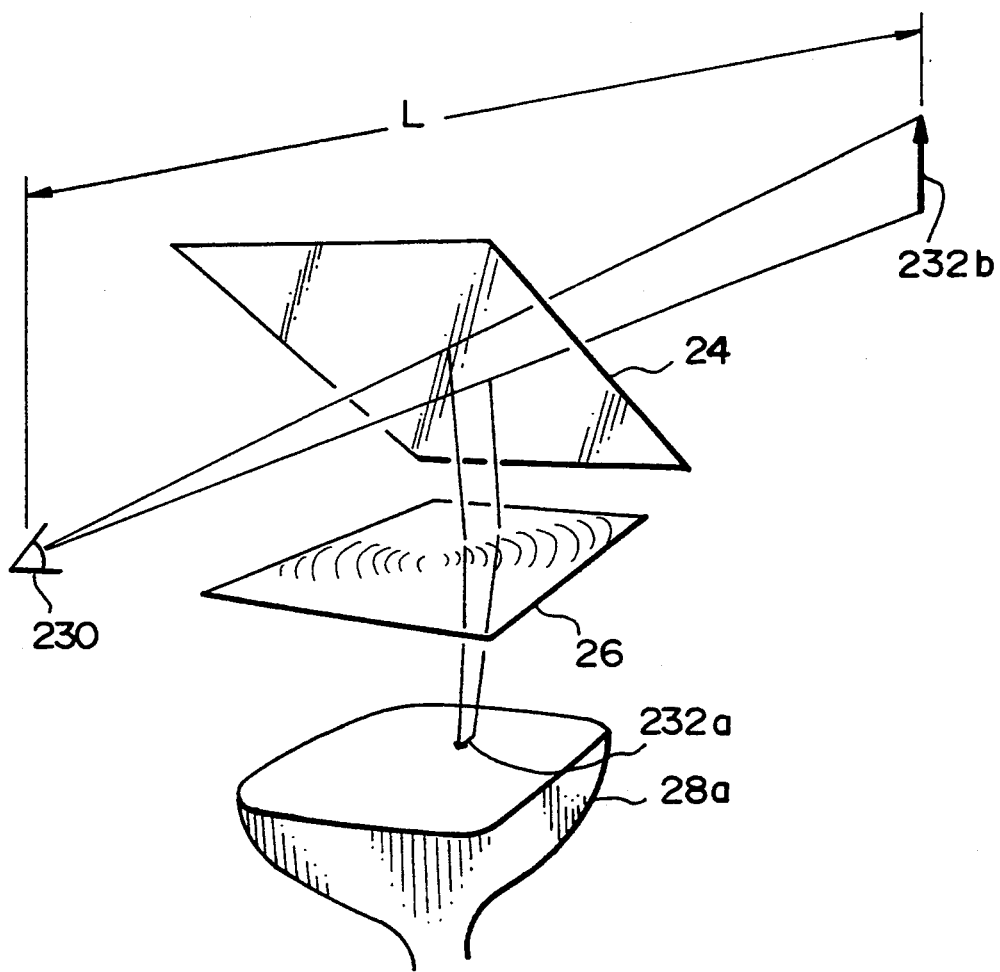
FIG. 5 is a view illustrating a principle of image synthesization in the image synthesizing scope used in the shooting game apparatus shown in FIGS. 1 to 4.

FIG. 5 illustrates the principle of the image synthesizing system in the image synthesizing scope 10.

The image synthesizing scope 10 includes a scope body 18 in which a transparent plate 24 or acryl, Fresnel lens 26 and display 28a are disposed.

The transparent acryl plate 24 functions as a transparent reflector for image synthesization and is located within the viewing window 12 with forward inclination of 45 degrees. The player will view the game stage 100 through the transparent acryl plate 24.

A CRT display 28a is disposed in an optical reflection-side path below the transparent acryl plate 24. Thus, the viewing point 230 of the player can observe a composite image formed by superimposing the scene of the game stage 100 viewed through the transparent acryl plate on the video scene displayed on the display 28a.

Particularly, the transparent acryl plate 24 has a reflectivity lower than the transmittance (about 9:1). If the scene of the game stage 100 positioned in the optical transmission-side path of the transparent acryl plate 24 is darker than the video scene displayed on the display 28a located in the optical reflection-side path of the transparent acryl plate 24, their brightness is balanced to form a composite image.

In this embodiment, a transparent acryl plate is used for a transparent reflector for image synthesization. In the case that the scene of the game stage 100 is brightened, a half-mirror having relatively high reflectivity can be used.

In this embodiment, the Fresnel lens 26 is disposed between the transparent acryl plate 24 and the display 28a to provide an optical system which can image the scene 232a on the display 28a at a farther position. Therefore, the scene 232a on the display 28a is enlarged by the Fresnel lens 26 and then reflected to the viewing point 230 by the transparent acryl plate 24. Thus, the scene 232a will be viewed from the viewing point 230 as an enlarged virtual image which is at a farther distance L. By displaying the video scene with an enlarged scale by the use of the Fresnel lens 26, the game can be more powerfully developed than the direct synthesization of video scene.

In this embodiment, the virtual image 232b is imaged at or somewhat forward of the game stage 100. This provides an alignment or distance between the video scene viewed from the viewing point 230 and the three-dimensional model.

Figure 6:
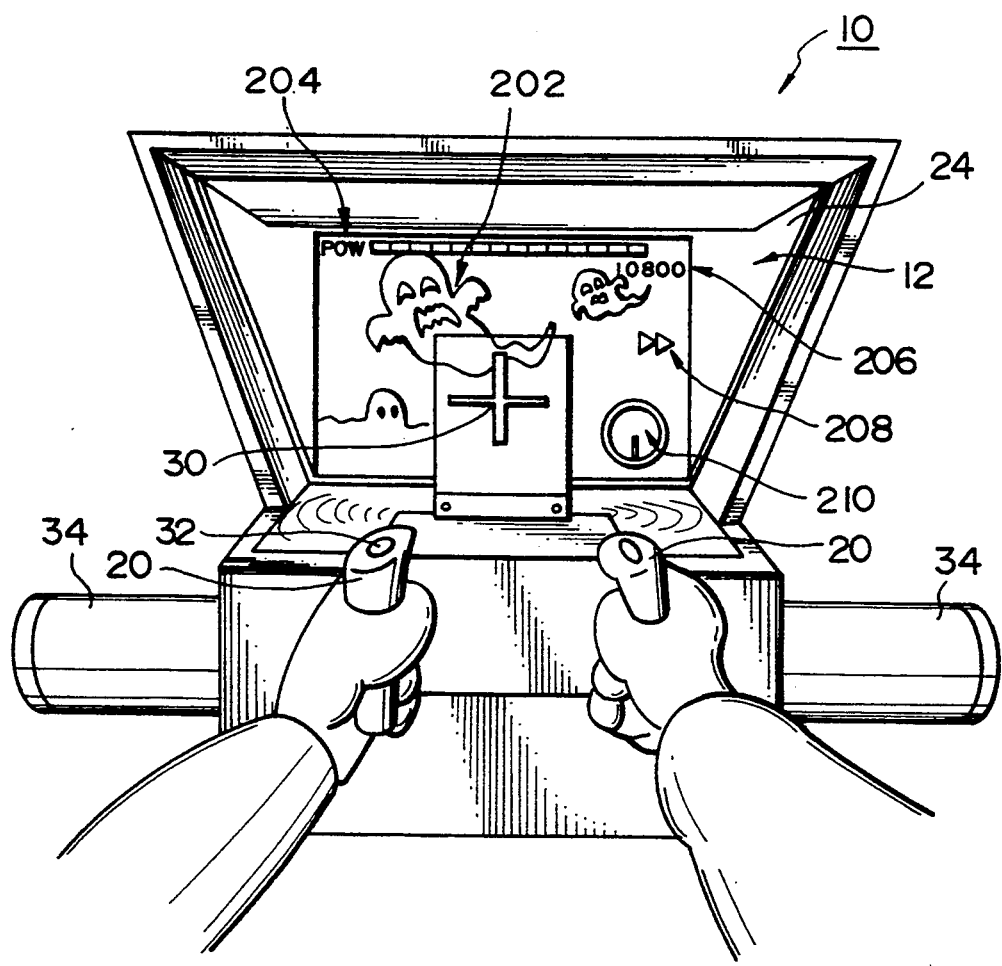
FIG. 6 is a schematic view illustrating the viewing window and its surrounding parts in the image synthesizing scope used in the shooting game apparatus shown in FIGS. 1 to 5.

FIG. 6 shows the front view of the viewing window 12 in the image synthesizing scope 10. A character 202 synthesized as a ghost and displayed in the viewing window 12 is formed such that the video scene displayed on the display 28a is imaged at a distance of L meters forward of the viewing window 12 under the influence of the Fresnel lens 26. This provides a wonderful realism as if the ghost is floating within the space apart from the viewing window by the distance of L meters.

Within the viewing window 12, there are also synthesized and displayed an energy meter 204, score 206, ghost sensor indication 208 and ghost radar 210 by using the display 28a. The energy meter 204 indicates the level of energy in a beam gun, barrier or the like. When the level of energy becomes zero, the game terminates. The score 206 indicates the marks obtained by the player. The ghost sensor indication 20 represents the direction of a ghost which is nearest in the viewed field. The ghost radar 210 shows the position and distance of at least one ghost which exists about the present position. Therefore, the player can move the viewing window 12 to the direction in which the ghost exists.

In front of the viewing window 12, a semitransparent aiming plate 30 is located. The player can aim the target ghost 202 through the aiming plate 30 and shoot it by actuating a trigger button 32. In order to increase the sound realism, a pair of speakers 34 are provided on the opposite sides of the scope body 18.

In the viewing window 12, the image of the ghost character 202 displayed and superimposed on the three-dimensional model of the game stage 100 may suddenly appear or disappear or obscurely be displayed by regulating the luminance of the character. This can produce the mysterious atmosphere of the ghost.

Figure 7:
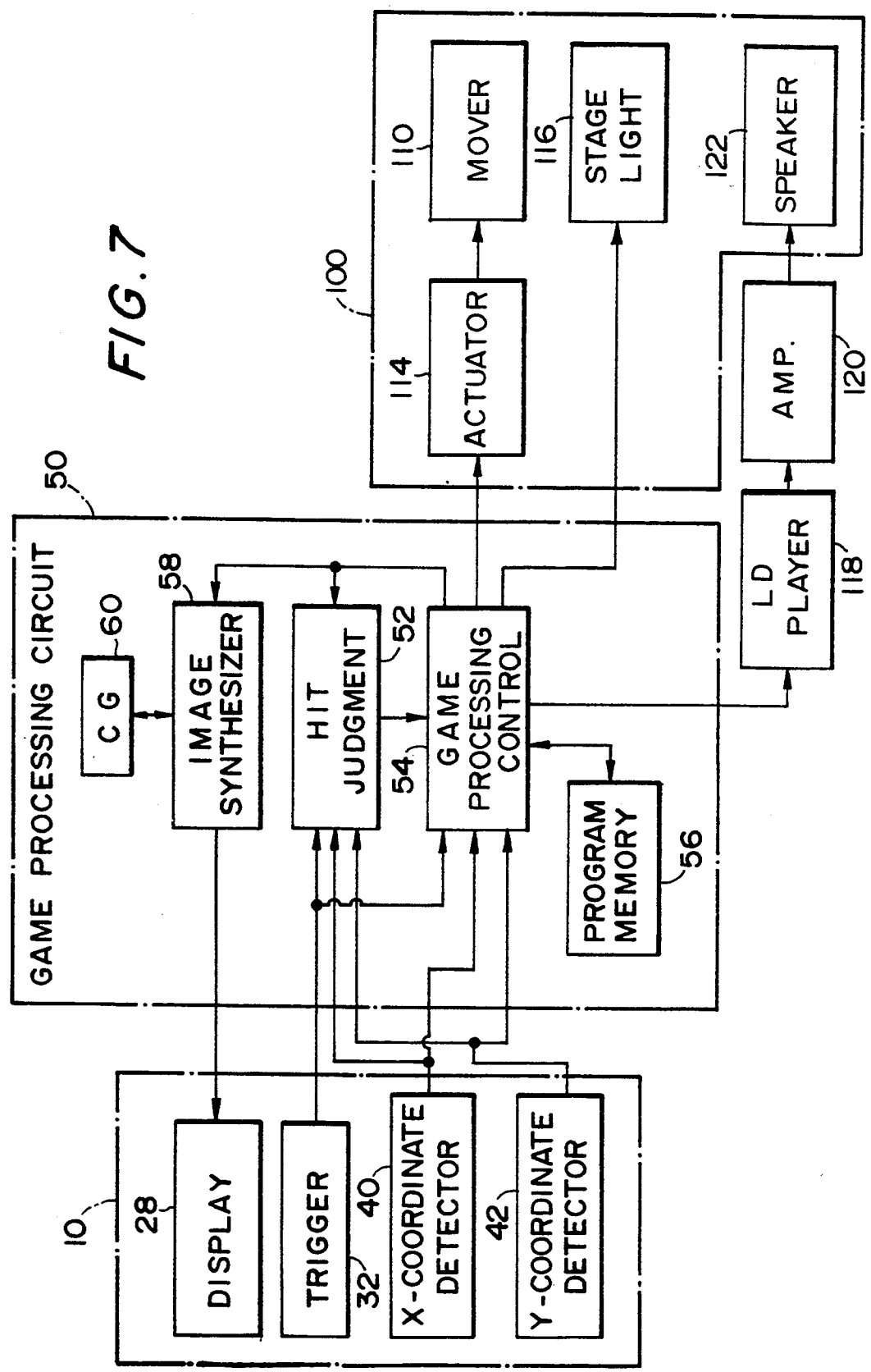
FIG. 7 is a block diagram of the primary parts of a circuit used in the shooting game apparatus shown in FIGS. 1 to 6.

FIG. 7 shows the primary parts of a circuit usable in the shooting game apparatus according to this embodiment.

Although the embodiment of the present invention has been described as to having a plurality of image synthesizing scopes, only a single image synthesizing scope 10 will be described below for simplification.

The image synthesizing scope 10 can be mounted for rotation both in the horizontal and vertical directions (X- and Y-directions) and includes the game stage 100 which can be observed by the player through the viewing window 12 in any direction. The direction of the viewing window 12 observing the game stage 100 may be represented by X- and Y-coordinates which are sensed by X- and Y-coordinate sensing sections 40 and 42, respectively. The outputs of the respective sections 40 and 42 are fed to a game processing circuit 50.

The game processing circuit 50 is connected to a plurality of image synthesizing scopes 10 to time-share signals from the image synthesizing scopes 10 for performing a desired process of game.

The game processing circuit 50 comprises a hit judging section 52, a game processing control section 54, a program memory 56, an image synthesizing section 58 and a character generator 60.

A game program and panorama scene synthesizing program have been written in the program memory 56. The game processing control section 54 is adapted to perform a given computation for the shooting game in accordance with these programs.

Like game processing control section 54 drives the actuator 114 in accordance with the result of the computation, drives and controls each movable part 100 set on the game stage 100, and controls lightning of each producing light 116 of the game stage 100.

The game processing control section 54 controls a laser disc player 118 in accordance with the result. The laser disc player 118 has received sound data for producing the game. The sound data is applied to the speakers 122 in the game stage 100 through an amplifier 120.

In such a manner, the movable parts 110, producing lights 116 and speakers 122 in the game stage 100 will be produced and controlled based on the result of the game processing control section 54. In the illustrated embodiment, the movable parts 110 and producing lights 116 are sequence-control led in accordance with the story in the game.

Based on its result, the game processing control section 54 is also adapted to provide control signals for synthesizing the video scene to the scene synthesizing section 58 while maintaining a given relationship with the motion of the movable parts 110 in the game stage 100.

In other words, the movable parts 110-1, 110-2, . . . 110-15 and producing lights 116 are sequence-control led to make the production in the game stage 100 in accordance with the game story. For the production in the game stage 100, the game processing control section 54 computes control signals which are used to synthesize the panorama scene 200 superimposed on the game stage 100 as shown in FIG. 4. The control signals for the panorama scene 200 include character displaying and controlling data used to move the characters 202 such as ghosts in adaptation to the motion of the movable parts 110 and background data operatively associated with the displaying of characters. The character displaying and controlling data include number for specifying the types of the characters displayed, character numbers for specifying the shapes of the characters and coordinate data (Xc, Yc) for specifying the positions of the characters displayed.

The game processing control section 54 prepares data used to display the window scene on the display 28a of the image synthesizing scope 10 from the panorama scene data, based on the viewing direction detection data inputted to the game processing control section 54 from the X- and Y-coordinate sensing sections 40 and 42. The prepared data is then fed to the scene synthesizing section 58 as window scene display data.

The character generator 60 has stored character data such as data relating to the shapes of various characters (ghosts) displayed as targets and data relating to the other shapes.

Based on the window scene display data fed from the game processing control section 54, the scene synthesizing section 58 synthesizes window scene signals by which the target characters are moved in adaptation to the motion of the movable parts 110 in the game stage 100. The window scene signals are then applied to the display device 28 in the image synthesizing scope 10. More particularly, based on the inputted window data, a character data relating to a shape corresponding to a selected character number data is read out from the character generator 60 and then combined with a desired background data before outputted to the display device 28.

Thus, the image synthesizing scope 10 can display the window scene on the display 28a by using the display device 28. The player will observe a composite scene obtained by synthesizing the window scene with the scene of the game stage 100 viewed through the viewing window 12.

The game processing circuit 50 synthesizes scenes for all the image synthesizing scopes 10 by the use of time-sharing technique.

If it is now assumed that two scenes 300a and 300b in the game stage 100 of FIG. 3 are viewed by two players through two image synthesizing scopes 10, the window scenes 220a and 220b shown in FIG. 4 will be displayed on the display 28a of the image synthesizing scopes 10.

When a viewing direction is shifted to another one by moving the image synthesizing scope 10, a viewing direction detection signal is real-time inputted from the X- and Y-coordinate sensing sections 40 and 42 to the game processing control section 54. Thus, the window scene displayed on the display 28a will also be scrolled in adaptation to the new viewing direction.

Therefore, if the scene 300a in the game stage 100 is viewed through the viewing window 12, for example, a ghost sitting on the rocking chair will be synthesized from the window scene.

Each of the image synthesizing scopes 10 according to the illustrated embodiment is formed to aim and shoot any character (ghost) 202 appearing in the game stage 100 by the use of a shooting device while the player is viewing the composite image displayed.

The shooting device of this embodiment comprises an aiming plate 30 shown in FIG. 6 and a trigger button 32. The player moves his or her image synthesizing scope 10 in both the vertical and horizontal directions to scroll the composite window scene viewed through the viewing window 12 for seeking for any ghost appearing in the game stage 100. At this time, the position data of the ghost appearing in the game stage 100 has already been provided as data of the panorama scene 200 as shown in FIG. 4. The game processing control section 54 outputs control signals for displaying the ghost sensor and radar 208, 210 shown in FIG. 6 to the scene synthesizing section 58. Based on such input signals, the scene synthesizing section 58 synthesizes and displays the ghost sensor and radar 208, 210 in the viewing window 12. Based on such displays, the player can move his or her image synthesizing scope 10 in both the vertical and horizontal directions to seek for any character such as ghost or the like. The player can then aim the ghost found through the viewing window 12 by the aiming plate 30 and shoot it by actuating the trigger button 22. The aimed position is informed to the hit judging section 52 and game processing control section 54 as X- and Y-coordinate data detected by the X- and Y-coordinate sensing sections 40 and 42.

The hit judging section 52 makes its judgment of hit by using the X- and Y-coordinates at the aimed position detected on inputting the trigger signal as an impact position (XB, YB).

In this embodiment, any character displayed as a target has a hit area having a given extent. If the impact position is in this hit area, this is judged to be a hit. The hit area is computed from the data for displaying the target character among the data which have been inputted from the game processing control section 54 to the scene synthesizing section 58. In other words, the hit area of the target character displayed on the display 28a is computed from the character number data included in the character displaying data and its position data. If all the shapes of hit area of the respective characters are set to have the same size, the hit judging section 52 can more simply compute the hit areas of the characters.

Figure 8:
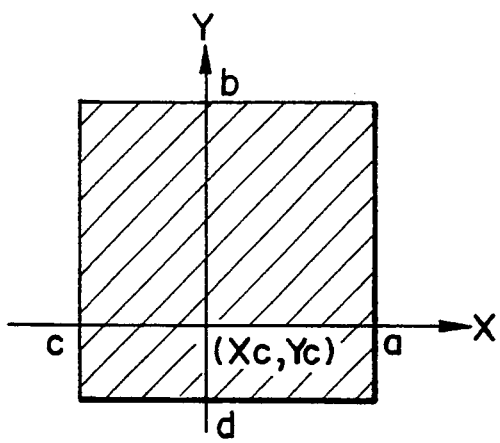
FIG. 8 illustrates the judgment for hitting in the shooting game apparatus shown in FIGS. 1 to 7.

If the hit area of each of the characters is of rectangular configuration as shown in FIG. 8, for example, the hit area (X, Y) can be defined against the position (Xc, Yc) of the displayed character by the following formula:

$$(X_c - C) \leq X \leq (X_c + a)$$

$$(X_c - d) \leq Y \leq (X_c + b) \qquad (1)$$

The hit judging section 52 judges whether or not the hit area (X, Y) shown by the first formula is included in the impact position (XB, YB). If the hit area is in the impact position, this is judged to be a hit. A hit detection signal is then fed to the game processing control section 54.

The game processing control section 54 is responsive to a trigger signal to output a signal for synthesizing and displaying a trajectory image matching the aimed position and direction to the scene synthesizing section 58 which in turn synthesizes and displays the trajectory image on the display 28a.

When the game processing control section 54 receives a hit signal from the hit judging section 52, the former computes the score obtained in the game, which is displayed on the display 28a. At the same time, the game processing control section 54 generates a control signal for displaying an image in which that character is hit.

Even if the position of the target is arbitrarily variable, the hit can be real-time judged from the hit area and the impact position.

On operation, a start button (not shown) is first depressed. A composite scene obtained by synthesizing the three-dimensional model defining the game stage 100 with a window scene displayed on the display 28a is displayed in the viewing window 12 of each of the image synthesizing scopes 10. The game processing control section 54 controls the movable parts 110 and producing lights 116 in the game stage 100 to produce a mysterious atmosphere inherent in the haunted house on the game stage 100. The game processing control section 54 further controls the laser disc player 118 and speakers 122 to output an effect sound in the haunted house and also to output a narration which describes a game story, "This is a lone house located far from town and adjacent a burying place. Till before several years, an old woman was in the lone house as a grave keeper. One day, the old woman went to the ghost castle and did not return to the house. Then, it is said that a mysterious event happened at every midnight in the lone house in which there is nobody. You are a ghost hunter. Please research this house and hunt out ghosts if they are in."

When at this time, a player views the game stage 100 through the viewing window 12 in his or her image synthesizing scope 10, the player can observe ghosts as shown in FIG. 4 which move the chandolier 110-1, the hands of the clock 110-3 and the rocking chair 110-13.

After such a narration explaining the game, the shooting game of this embodiment is started.

At the same time, the player moves his or her image synthesizing scope 100 in both the vertical and horizontal directions to scroll the window scene 220 displayed in the viewing window 12 as shown in FIG. 4 within the extent of the panorama scene 200. In such a manner, the player can seek for ghosts appearing in the haunted house. At this time, the ghosts displayed on the display 28a in the extent of the window scene are enlarged by the Fresnel lens 26 into virtual three-dimensional images which are located at or somewhat forward of the three-dimensional model defining the game stage 100. The window scene 220 can be observed with reality by the player through the viewing window 12 as if the ghosts are flying about in the haunted house. At this time, further, any visual production can easily be programed as changing the luminance of each of the ghosts in the window scene 220 or as providing any mysterious atmosphere which becomes foggy or misty. This can provide the most suitable effect to the haunted house.

Particularly, this embodiment is adapted to display a composite scene which is obtained by superimposing the image of the three-dimensional model defining the game stage 100 on the window scene displayed on the display 28a. Especially, the target characters (ghosts) are displayed and controlled in adaptation to the motion of the movable parts 110-1, 110-2, ... 110-15 in the three-dimensional model. For example, the composite scene may be provided as if a ghost character flies out immediately after the lid 110-8 of the basement opened with a bang, or as if another ghost character clatteringly moves the poker 110-5. This can provide a shooting game which is visually varied and produced with an improved effect.

When the player finds any ghost through the viewing window 12 of his or her image synthesizing scope 10, he or she aims and shoots it.

At this time, the aforementioned indicators such as ghost sensor 208, ghost radar 210 and so on are displayed in the viewing window 12, as shown in FIG. 6. According to these indicators, the player can move the scope 10 in both the vertical and horizontal directions to scroll the displayed scene. Thus, he or she can more quickly find any ghost appearing in the haunted house.

Thus, the game apparatus of the embodiment can provide a composite scene which is visually varied and produced with an increased effect by displaying and controlling the ghosts in adaptation to the motion of the movable parts 110 in the game stage 100, in addition to such amusement as the player can observe the ghosts appearing in the haunted house through the viewing window 12 of the image synthesizing scope, but not find any ghost in the haunted house without use of the viewing window.

In the embodiment, particularly, the three-dimensional model is used to provide a background in the video scene. This can greatly reduce the processing of image data in comparison with the background which is synthesized with the video scene. Therefore, a plurality of image synthesizing scopes as used in this embodiment can be processed in time sharing with an increased speed.

Since the image is not be processed with respect to the background, all the memory used can be assigned to the characters such as ghosts and the like, so that much more ghosts can be synthesized and displayed with increased variations.

As described, the game apparatus of the embodiment synthesizes and displays the panorama scene 200 as shown in FIG. 4 with the three-dimensional model as shown in FIG. 3 while scrolling the window scene displayed in the viewing window 12. The window scene displayed in the viewing window 12 may be part of the panorama scene. Thus, the image synthesizing scope 10 can be reduced in size and yet used to display a game with its increased scale.

Furthermore, this embodiment can provide a shooting game with increased amusement that the synthesized and displayed ghosts in the haunted house can be shot by the player while he or she moves his or her image synthesizing scope 10 in both the vertical and horizontal directions. Therefore, the shooting game of the embodiment can be visually varied and amusing in comparison with the prior art shooting games.

It is to be understood that the present invention is not limited to the embodiment shown in the drawings and described in the aforementioned disclosure, but may be applied in many modified or changed forms without departing from the scope of the invention.

Figure 9:
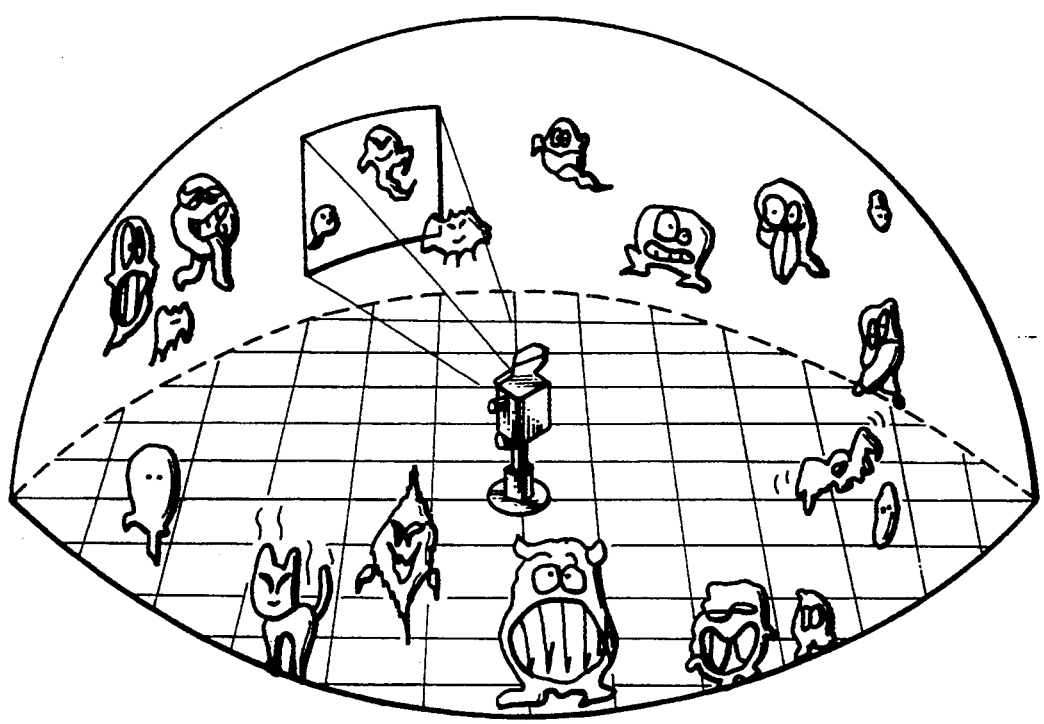
FIG. 9 is a schematic view of another preferred embodiment of an image synthesizing system constructed in accordance with the present invention.

Although the present invention has been described as to the game stage 100 which is located in front of the image synthesizing scopes 10, the game stage 100 may be formed into a spherical configuration having its curvature of about 5 meters, as shown in FIG. 9. At this time, each of the image synthesizing scopes 10 may be arranged to be movable about the center of curvature in both the vertical and horizontal directions. In addition, the program memory 56 has stored a program for synthesizing and displaying a semi-spherical panorama scene. The image synthesizing scope 10 may include an optical system for imaging the window scene of the display 28a at or somewhat forward of the game stage 100 and be adapted to scroll the window scene displayed in the viewing window 12 depending on the direction of the viewing window 12.

When the player moves his or her image synthesizing scope 10 in both the vertical and horizontal directions, therefore, he or she can experience a virtual world through the viewing window 12.

It is of course possible that the player can be pleasured by a shooting game in such a virtual world.

Figure 10A:
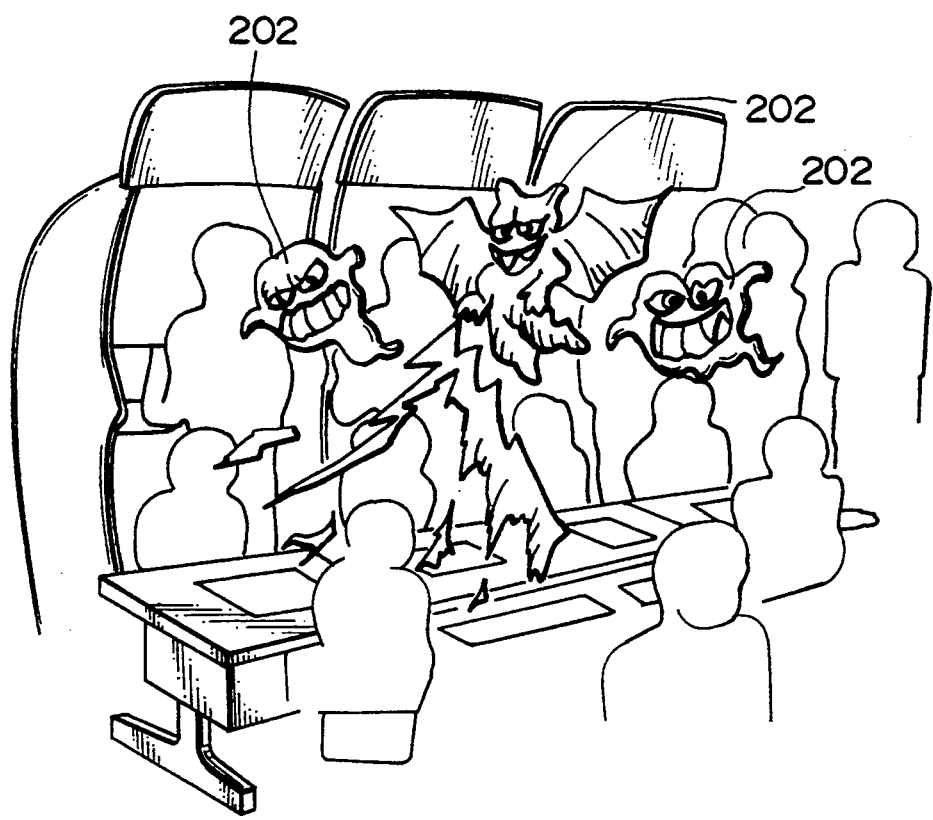
FIG. 10A illustrates the image synthesizing scope of the present invention which is located in a game center to play a shooting game.

Although the present invention has also been described as to an exclusive game stage 100, the present invention may be similarly applied to a shooting game system which comprises a plurality of image synthesizing scopes 10 in a game center or the like and which is adapted to synthesize and display flying ghosts in the space of the game center as shown in FIG. 10A, rather than the game stage by the use of window scenes and to shoot these ghosts in the same manner as in the first embodiment.

Further, each of the image synthesizing scopes 10 may be mounted in any suitable vehicle which is operated to move within a game space by a player. Depending on the position of the moving vehicle, various types of characters may be synthesized and displayed in the game space, as in the aforementioned embodiments.

Figure 10B:
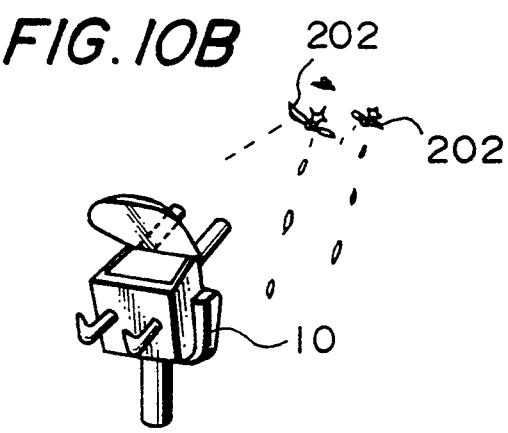
FIG. 10B illustrates the image synthesizing scope of the present invention which is disposed on the rooftop of a department store to play a shooting game.
Figure 11:
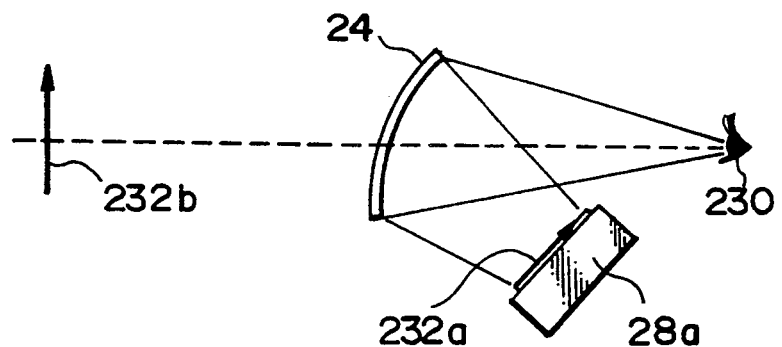
FIG. 11 illustrates another principle of image synthesization in the present invention.
Figure 12:
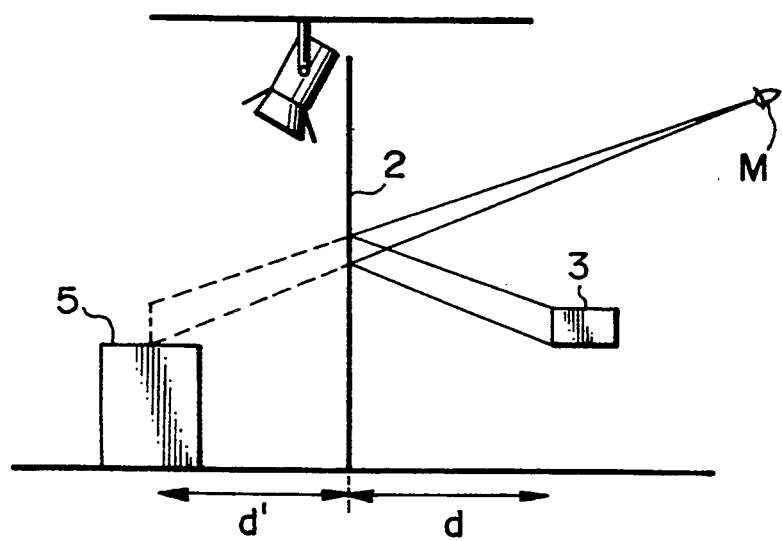
FIG. 12 is a schematic view of an image synthesizing system constructed in accordance with the prior art.

If the image synthesizing scopes 10 are located outdoors, the sky scene may be synthesized with a window scene including fighting planes which attack players, as shown in FIG. 10B. The players can shoot the fighting planes, as in the previous embodiments.

Although the present invention has been described as to the Fresnel lens 26 which is disposed between the transparent acryl plate 24 and the display 28a, the present invention may be similarly applied to an image synthesizing system which comprises a concave-shaped transparent reflector made of transparent acryl plate or half-mirror to image the window scene at a remote position.

As will be apparent from the foregoing, the image synthesizing scope of the present invention has stored data of a panorama scene which is variable depending on the proceeding of a game story. Depending on the viewing direction, the window scene displayed in the viewing window as video scene is scrolled within the extent of the panorama scene to superimpose it on the scene viewed through the viewing window. Thus, the wide play space used as a background can be displayed while being superimposed on the video scene. In accordance with the present invention, particularly, the dimensions of the image synthesizing display used may be sufficient to cover the extent of the viewing window, irrespectively of the dimensions of the play space. Therefore, a composite scene having an enlarged scale may be viewed by the players through a display which is reduced in size and through image synthesizing scopes which is also reduced in size and inexpensive in manufacturing.

The image synthesizing system of the present invention comprises image synthesizing scopes each of which can form a composite scene obtained by displaying the three-dimensional model including movable producing parts while being superimposed on the window scene. Furthermore, the window scene viewed through the viewing window of each of the image synthesizing scopes is controlled in adaptation to the motion of the movable parts in the three-dimensional model. Thus, the motion of the composite scene can be provided on both the sides of the three-dimensional background model and window scene displayed superimposed on time three-dimensional model. This can provide a composite scene which is visually varied and produced with increased effect.

The shooting game apparatus of the present invention utilizes the image synthesizing scopes each of which can scrollingly display the target characters as window scene in adaptation to the viewing direction in time viewing window. This can provide an improved property of game that the target characters cannot be shot by the players if the target characters are not found by changing the viewing direction in the image synthesizing scopes. Thus, time present invention can provide a shooting game which is visually varied and produced with increased effect, in comparison with the prior art shooting games in which all the target characters have already been displayed on the entire surface of the display at the start of time game.

Particularly, since the position of each of the target characters has already been provided as an image signal, the hitting may be judged with reality from time data of hit area and impact position, even if that target character is severely changed from one position to another.

We claim:

1. An image synthesizing scope comprising:
   a viewing window selectively viewing a scene from a predetermined play space, wherein the play space is larger than the scene viewed through the viewing window;
   a direction detecting sensor sensing a viewing direction of the viewing window;
   a transparent reflector forming a composite image, the transparent reflector including an optical transparent-side path and an optical reflecting-side path, an optical viewing path of said viewing window located in one of said optical transparent-side path and said optical reflecting-side path;
   a video display disposed in the other of said optical transparent-side path and said optical reflecting-side path of said transparent reflector, the video display superimposing a window image through said transparent reflector onto the scene viewed through said viewing window; and
   window control means for displaying and controlling the window image of said video display, said window control means comprising:
   image data memory means for storing data of a panorama scene superimposable on said play space, wherein the panorama scene is larger than the scene viewed through said viewing window; and
   image synthesizing means responsive to the output of said direction detector sensor for reading data of a varying portion of the panorama scene from the image data memory means as the window image and for displaying the window image on said video display, the varying portion of the panorama scene corresponding to the scene viewed through the viewing window, wherein said window image is formed by scrolling said panorama scene based on a direction detected by said direction detecting sensor and said composite image is formed by superimposing the window image on the scene viewed through the viewing window.

2. The image synthesizing scope of claim 1, further comprising an optical focusing system disposed between said video display and said transparent reflector, said optical focusing system focusing the window image of said video display at a remote position.

3. The image synthesizing scope of claim 1, wherein said transparent reflector is a half-mirror.

4. The image synthesizing scope of claim 1, wherein said transparent reflector is a transparent plate and wherein said video display disposed in the optical reflecting-side path of said transparent plate.

5. A shooting game apparatus comprising:
at least one image synthesizing scope displaying at least one target character, the target character superimposed onto a scene of a predetermined play space; and
shooting means for shooting the target character displayed by said image synthesizing scope, said image synthesizing scope comprising:
a viewing window viewing the scene of the predetermined play space, wherein the play space is larger than the scene viewed through the viewing window;
a direction detecting sensor sensing a viewing direction of said viewing window;
a transparent reflector forming a composite image, the transparent reflector including an optical transparent-side path and a reflecting-side path, an optical viewing path of said viewing window located in one of said optical transparent-side path and said optical reflecting-side path;
a video display disposed in the other of said optical transparent-side path and said optical reflecting-side path of said transparent reflector, the video display superimposing a window image through said transparent reflector onto the scene viewed through said viewing window; and
window control means for displaying and controlling the window image of said video display, said window control means comprising:
image data memory means for storing data of a panorama scene, wherein the panorama scene is larger than the scene viewed through the viewing window, the panorama scene including said target character; and
image synthesizing means responsive to the output of said direction detecting sensor for reading data of a varying portion of the panorama scene from the image data memory means as the window image and for displaying the window image on said video display, the varying portion of the panorama scene corresponding to the scene viewed through the viewing window, wherein said window image, including said target character, is formed by scrolling said panorama scene based on the direction detected by said direction detecting sensor and said composite image is formed by superimposing the window image on the scene viewed through the viewing window, and
said shooting means comprising:
aiming means for aiming at the target character displayed in said viewing window;
trigger means for generating a trigger signal;
detecting means for detecting an aimed position of said aiming means; and
hit judging means for detecting a hit area of said target character and for judging whether said aimed position is within said hit area when said trigger signal is generated.

6. The shooting game apparatus of claim 5, further comprising an optical focusing means disposed between said video display and said transparent reflector for focusing the window image of said video display at a remote position.

7. The shooting game apparatus of claim 5, wherein said transparent reflector is a half mirror.

8. The shooting game apparatus of claim 5, wherein said transparent reflector is a transparent plate and wherein said video display is disposed in the optical reflecting-side path of said transparent plate.

9. An image synthesizing system comprising:
a three-dimensional model having at least one movable part producing and defining a predetermined play space; and
at least one image synthesizing scope viewing said three-dimensional model, the image synthesizing scope comprising:
a viewing window selectively viewing a scene from the predetermined play space, wherein the play space is larger than said scene viewed through the viewing window;
a direction detecting sensor sensing a viewing direction of the viewing window;
a transparent reflector forming a composite image, the transparent reflector including an optical transparent-side path and an optical reflecting-side path, an optical viewing path of said viewing window located in one of said optical transparent-side path and said optical reflecting-side path;
a video display disposed in the other of said optical transparent-side path and said optical reflecting-side path of said transparent reflector, the video display superimposing a window image through said transparent reflector onto the scene of said three-dimensional model viewed through said viewing window; and
window control means for displaying and controlling the window image of said video display in response to a motion of said movable part in said three-dimensional model, said window control means comprising:
image data memory means for storing the data of a panorama scene, wherein the panorama scene is larger than said scene viewed through the viewing window, the panorama scene varying depending on the motion of said movable part, the panorama scene being displayed over said three-dimensional model; and
image synthesizing means responsive to the direction detector sensor for reading data of a portion of the panorama scene from the image data memory means as the window image and for displaying the window image on said video display, wherein the portion of the panorama scene corresponds to the scene viewed through the viewing window, said window image is formed by scrolling said panorama scene based on the direction detected by said direction detecting sensor and said composite image is formed by superimposing said window image on the scene viewed through the viewing window.

10. The image synthesizing system of claim 9, further comprising an optical focusing means disposed between said video display and said transparent reflector for focusing the window image of said video display at a remote position.

11. The image synthesizing system of claim 9, wherein said transparent reflector is a half-mirror.

12. The image synthesizing system of claim 9, wherein said transparent reflector is a transparent plate and wherein said video display is disposed in the optical reflecting-side path of said transparent plate.

13. The image synthesizing system of claim 9, wherein said three-dimensional model forms a semi-spherical game stage defining a game space, said image synthesizing scope positioned at the center of curvature of said semi-spherical game stage, said image synthesizing scope movable to view said game stage in any direction, wherein a player can move said image synthesizing scope to experience a virtual world through the viewing window.

14. A shooting game apparatus comprising:
a three-dimensional model including at least one movable part and defining a play space;
at least one image synthesizing scope movable to view said three-dimensional model in any direction and adaptable to display a plurality of target characters superimposed on said three-dimensional model; and
a shooting device shooting at least one of the plurality of target characters displayed by said image synthesizing scope, said image synthesizing scope comprising:
a viewing window;
a direction detecting sensor sensing a viewing direction of said viewing window;
a transparent reflector forming a composite image and including an optical transparent-side path and an optical reflecting-side path, an optical viewing path of said viewing window located in one of said optical transparent-side path and said optical reflecting-side path;
a video display disposed in the other of said optical transparent-side path and said optical reflecting-side path of said transparent reflector, the video display superimposing a window image through said transparent reflector onto the scene of said three-dimensional model viewed through said viewing window; and
window control means for displaying and controlling the window image of said video display in response to a motion of said movable part in said three-dimensional model, said window control means comprising:
image data memory means for storing data of a panorama scene of said plurality of target characters, the panorama scene varying depending on the motion of said movable part, the panorama scene displayed over said three-dimensional model; and
image synthesizing means responsive to the direction detector sensor for reading data of the window image to be viewed through the viewing window from the data of said panorama scene and for displaying the window image on said video display, wherein said window image, including said plurality of target characters, is formed by scrolling said panorama scene based on the direction detected by said direction detecting sensor and said composite image is formed by superimposing the window image on the scene viewed through the viewing window, and
said shooting device comprising:
aiming means for aiming at least one of the plurality of target characters displayed in said viewing window;
trigger means for generating a trigger signal;
detecting means for detecting an aimed position of said shooting means; and
hit judging means for detecting a hit area of at least one said target character and for judging whether said aimed position is within said hit area when said trigger signal is generated.

15. The shooting game apparatus of claim 14, further comprising an optical system focusing means disposed between said video display and said transparent reflector for focusing the window image of said video display at a remote position.

16. The shooting game apparatus of claim 15, wherein said optical focusing means includes a Fresnel lens.

17. The shooting game apparatus of claim 15, wherein said three-dimensional model provides a game stage defining a game space and wherein a plurality of said image synthesizing scopes are arranged radially toward said game stage, each one of a plurality of said shooting devices is paired with one of said image synthesizing scopes, wherein a plurality of players can operate said shooting game apparatus.

18. The shooting game apparatus of claim 14, wherein said three-dimensional model forms a game stage defining a game space and wherein a plurality of said image synthesizing scopes are arranged radially toward said game stage, each one of a plurality of said shooting devices is paired with one of said plurality of image synthesizing scopes, wherein a plurality of players can operate said shooting game apparatus.

19. The shooting game apparatus of claim 14, wherein said window control means controls said video display and displays a plurality of indicators representing the position and direction of any one of the plurality of target characters outside of said window scene.

20. The shooting game apparatus of claim 17, wherein said window control means controls said video display and displays a plurality of indicators representing the position and direction of any one of the plurality of target characters outside of said window scene.

* * * * *